United States Patent

[11] 3,621,043

[72] Inventors: Takashi Seki, Miyayamacho, Toyonaka; Chiharu Saito, Sonehigashi-machi, Toyonaka; Katsuyuki Toki, Kohshienguchi, Nishinomiya; Keisuke Matsuka, Shonai-nishimachi, Toyonaka; Yoshio Suzuki, Kawaranomiya, Amagasaki; Akira Kobayashi, Ikeda, all of Japan
[21] Appl. No. 642,266
[22] Filed Mar. 22, 1967
[45] Patented Nov. 16, 1971
[73] Assignee Sumitomo Chemical Co., Ltd. Osaka, Japan
[32] Priorities Feb. 6, 1963
[33] Japan
[31] 38/6314; Feb. 6, 1963, Japan, No. 38/6315; Aug. 14, 1964, Japan, No. 39/46998; Aug. 28, 1964, Japan, No. 39/49074; Aug. 29, 1964, Japan, No. 39/49120; Aug. 29, 1964, Japan, No. 39/49121 Original application Aug. 10, 1965, Ser. No. 478,758, now abandoned, which is a continuation-in-part of application Ser. No. 342,682, Feb. 5, 1964, now abandoned. Divided and this application Mar. 22, 1967, Ser. No. 642,266

[54] N-SUBSTITUTED OCTADECADIENOIC ACID AMIDES AS CHOLESTEROL LOWERING AGENTS
3 Claims, No Drawings

[52] U.S. Cl. .................................................. 260/404, 260/239, 260/247.2, 260/294, 260/326.8, 424/244, 424/248, 424/267, 424/274, 424/320, 424/324
[51] Int. Cl. ............................................................ C09f 7/00
[50] Field of Search .............................................. 260/404; 424/320; 342/682

[56] References Cited
UNITED STATES PATENTS

| | | | |
|---|---|---|---|
| 2,078,653 | 4/1937 | De Groote et al. | 260/404 |
| 2,683,132 | 7/1954 | Young et al. | 260/45.9 |
| 3,417,114 | 12/1968 | Kuceski | 260/404 |
| 2,094,609 | 10/1937 | Kritchevsky | 260/404 |
| 2,384,811 | 9/1945 | Coleman et al. | 260/404 |
| 2,614,981 | 10/1952 | Lyté | 260/404 |
| 2,684,969 | 7/1954 | Krems et al. | 260/404 |
| 3,147,261 | 9/1964 | Mod et al. | 260/404 |
| 3,288,822 | 11/1966 | Hall et al. | 260/404 |
| 3,324,179 | 6/1967 | Scholz | 260/404 |

OTHER REFERENCES

De Conno et al.; " The Action of Aromatic Amines on the Fatty Acids" (1917) CA 12 pp. 1172- 1173 (1918)

Kaufmann et al.; " Synthesis of 9,12-Linoleic Acid Ders. through their Bromine Adducts" (1958) CA54 pp. 5445- 5446 (1960)

Dermer et al.; " N-Benzylamines as Ders. for Ident. the Acyl Group in Esters" (1943) CA37 pp. 3733- 3734 (1943)

Jacobson, " J. Amer. Chem. Soc.," Vol. 74, pages 3423- 3425

Primary Examiner—Lewis Gotts
Assistant Examiner—G. Hollrah
Attorney—Wenderoth, Lind & Ponack ABSTRACT: N-substituted octadecadienoic acid amides of the formula

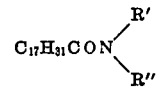

wherein R' is, for example, α-methylbenzyl and various other organic substituents, and R" is hydrogen or a radical described with respect to R', are provided, which compounds exhibit cholesterol-lowering activity.

N-SUBSTITUTED OCTADECADIENOIC ACID AMIDES AS CHOLESTEROL LOWERING AGENTS

This application is a division of Ser. No. 478,758 filed Aug. 10, 1965, now abandoned, which in turn, is a continuation-in-part of Ser. No. 342,682, filed Feb. 5, 1964, and now abandoned.

The present invention relates to novel type of cholesterol-lowering agents. More particularly, it relates to agents which are useful for the reduction of the elevated blood cholesterol level. The invention also relates to the production of compounds useful as these agents.

Atherosclerosis is one of the problems in the adult diseases, which have not come to a satisfactory solution. Although the cause of atherosclerosis has not yet been brought to light in spite of the discussions in the academic world, it has broadly been recognized that one of the most significant histopathological manifestations of atherosclerosis is the deposition of lipids in the blood vessels. Accordingly, the researches have been aimed to the disturbed metabolism of lipids, and the attention has been paid from the beginning to the extraordinarily elevated level of cholesterol in the blood.

A number of experimental and clinical facts have been reported which point out the relationship between atherosclerosis and elevated blood cholesterol level. Hence, the development of agents to reduce the elevated blood cholesterol level is one of the most important keys for the precaution or prevention of atherosclerosis.

Concentrated efforts have heretofore been made for the development of such agents as lowering cholesterol, not a few compounds have been tested clinically, but none of them are satisfactory. Some are fairly excellent in their effectiveness but are not avoidable from the harmful side effects which are not negligible, and the others are insufficient in their effectiveness, namely needing administration in abundant doses.

A sole group of compounds practically employed nowadays for the purpose comprises unsaturated fatty acids, especially linoleic acid. The reason why linoleic acid is employed is in its safety or harmlessness to the human body. As regards the effectiveness, however, it is not so high and is uncertain and indefinite. Accordingly, the administration in abundant doses is necessary to expect at least appreciable efficacy as cholesterol-lowering agents.

Thus, an object of the present invention is to provide novel group of cholesterol-lowering agents having superior effectiveness to reduce the elevated level of cholesterol in the blood, without appreciable toxicities, as compared with the known agents. Another object is to provide a method for the precaution or prevention of atherosclerosis by the use of a novel group of compounds. Other objects and advantages would be apparent from the following description.

Duly recognizing the disadvantages of the agents to reduce the blood cholesterol level, heretofore proposed and employed, and in order to meet the demand of the novel superior agents, we have conducted broad researches as to variety of compounds, and have found that N-substituted octadecadienoic acid amide compounds fulfill the requirements.

According to the biological tests, there acid amide compounds excel linoleic acid in the effectiveness to reduce the elevated level of cholesterol in the blood. Besides, the uncertainty or indefiniteness of such effectiveness, as seen in linoleic acid, is improved in the present acid amide compounds. They are comparable with linoleic acid in their safety or harmlessness even when continuously administered for a long period of time, and in their steady and constant effectiveness during the course of continuous administration. Such kinds of specific biological properties of the present acid amides compounds have never been reported before the present invention.

The novel group of the cholesterol-lowering agents of this invention comprises octadecadienoic acid amide derivatives of the formula

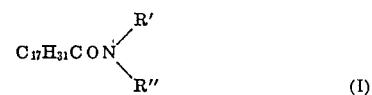

wherein R' is a member selected from the group consisting of alkyl, alkenyl, cycloalkyl, alkylcycloalkyl, hydroxycycloalkyl, alkoxycycloalkyl, aryl, alkylaryl, hydroxyaryl, alkoxyaryl, halogenoaryl, halogenoalkylaryl, alkoxyhalogenoaryl, halogenoalkylhalogenoaryl, aralkyl, alkylaralkyl, hydroxyaralkyl and alkoxyaralkyl having not more than 36 total carbon atoms, R'' is a member selected from the group consisting of hydrogen atom and the radicals described with respect to R', and R''' is a member selected from the group consisting of bivalent alkylene, oxygen-containing alkylene and alkenylene residues having not more than seven total carbon atoms.

These compounds may be produced, according to this invention, by reacting an octadecadienoic acid or its reactive derivative of the formula:

wherein A is hydroxy radical, a halogen atom or a lower alkoxy radical, with an organic primary or secondary amine of the formula:

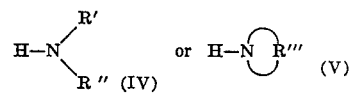

wherein R', R'' and R''' are defined before.

As a result of energetic and extensive researches made by us on the biological activities, we have found that the above-mentioned compounds remarkably lower the concentration of cholesterol in blood in such experimental animals as mice, rats, rabbits, dogs and monkeys and that, even with the continuous administration for several months, no undesirable toxicity will be shown at all.

It is known that linoleic acid may be used for similar purpose, but the present particular compounds are far superior to linoleic acid in respect of effects and toxicity.

The compounds of the present invention, therefore, are expected to be gospels to may cholesterol blood disease and atherosclerosis patients.

The octadecadienoic acid to be employed in the present invention may be of any origin. Usually linoleic acid originating from any of various natural fats and oils, specifically vegetable oils, and essentially composed of octadeca-9,12-dienoic acid of the formula:

CH$_3$(CH$_2$)$_4$CH CH-CH$_2$-CH CH-(CH$_2$)$_7$-COOH is the most preferable material for the invention, although any other isomeride of octadecadienoic acid may also be employed. Comparatively pure linoleic acid can be obtained, for example, by the purification of safflower oil fatty acid such as low-temperature recrystallization method, distillation method, urea method, salt recrystallization method, etc.

Linoleic halides are known and their production methods have already been proposed in various literatures, among which are thionyl chloride method, phosgene method, etc. By these methods are produced the acid chloride, acid bromide, acid iodide and the like, among which the acid chloride is most important in this invention.

Examples of the lower alkoxyl radical A in the formula (III) are those of methyl, ethyl, n-propyl, i-propyl, n-butyl, i-butyl and t-butyl.

Typical amines of the formula:

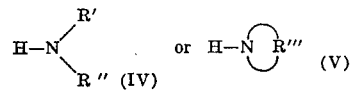

(wherein R', R" and R''' are the same as defined above) to be employed in the present invention are as follows. It is needless to say that it has been proved by us that any other amines can be also used without any trouble in working the present invention as far as they are primary or secondary amines. They are such mono- or dialkylamines, such lower alkylamines as mono- or dimethylamine, mono- or diethylamine, mono- or di-n- or i-propylamine, and mono- or di-n-, i- or t-butylamine and such higher alkylamines as mono- or di-dodecylamine, mono- or dipalmitylamine and mono- or distearylamine; as mono- or dialkenylamines, such amines as mono- or diallylamine, mono- or dioleylamine, mono- or dilinoleylamine and mono- or dilinolenylamine; as cycloalkylamines or their derivatives, such amines as cyclopentylamine, cyclohexylamine, cycloheptylamine, N-methyl-, N-ethyl-, N-n- or i-propyl or N-n,i,t-butylcyclopentylamine, N-methyl- or N-ethyl-N-n(or i)-propyl- or N-n,i,t-butyl-cyclohexylamine, N-methyl-, N-ethyl, N-n- or i-propyl or N-n,i,t-butylcycloheptylamine, N-cyclohexyl- or N-phenyl-N-cyclohexylamine; lower alkylcycloalkylamines substituted by one or more of methyl ethyl, n- or i-propyl or n-, i- or t-butyl radical in at least 2,3 or 4 position, hydroxy-cycloalkylamines substituted by one or more of hydroxy radicals in at least a 2, 3 or 4 position and cycloalkylamine, substituted by one or more of lower alkyl and hydroxy radical at least a 2, 3 or 4 position, lower alkoxycycloalkylamine substituted by methoxy, ethoxy, n- or i-propoxy, n-, i- or t-butoxy or other alkoxy radicals in at least a 2, 3 or 4 position; as heterocyclic compounds, for example, pyrrole, pyrrolidine, piperidine, hexamethyleneimine, piperazine and morphorine; as aromatic amines, for example, aniline, diphenylamine, benzylamine, lower alkylaniline substituted by one or more methyl, ethyl, n-, i-propyl and n-, i-, t-butyl radicals in at least an ortho, meta or para position, N-methyl- or N-ethyl-anilines, hydroxyaniline substituted by one or more hydroxy radicals in at least an ortho, meta or para position, lower alkoxyaniline substituted by one or more of methoxy or ethoxy, n-, i-propoxy, n-, i-, t-butoxy radical in at least an ortho, metha or para position, halogenoaniline substituted by one or more of fluorine, chlorine, bromine or iodine atom in at least an ortho, metha or para position, trifluoromethylaniline substituted by one or more of trifluoromethyl radicals in at least an ortho, meta or para position, aniline substituted by one or more or lower alkyl, hydroxy, halogen, lower alkoxy or trifluoromethyl radicals, such as 2,4,6-trimethylaniline and fluorotoludines, dibenzylamine, lower alkylbenzylamine such as α-methylbenzylamine, α-ethylbenzylamine, α-n,i-propyl, α-n,i,t-butyl and the like, lower alkylbenzylamine substituted by methyl, ethyl, n- or i-propyl, n, i or t-butyl or other lower alkyl radicals, lower alkoxybenzylamine substituted by methoxy, ethoxy, n-, i-propoxy, n-, i-, t-butoxy or other lower alkoxy radicals in at least an ortho, meta, or para position, hydroxybenzylamine substituted in at least an ortho, meta or para position, and benzylamines substituted by one or more of lower alkyl, lower alkoxy or hydroxy radicals.

For the production of the present octadecadienoic acid amides may be used any of the processes known for the preparation of acid amides.

For example, (1) an octadecadienoic acid is made to react directly with an amine of the formula:

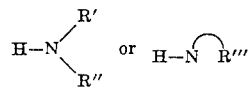

(wherein R', R" and R''' are as defined above) in the presence or absence of such dehydrating agent as a di-substituted carbodiimide compound, p-toluenesulfonic acid or p-toluene-sulfonyl chloride in an aqueous or organic solvent, (2) an octadecadienoic acid is converted to acid chloride (Organic Synthesis vol. 37, page 56) and the resulting acid chloride is brought into contact with at least an equimolar amount of the amine in the presence of a basic condensing agent, (3) a lower alkyl ester of an octadecadienoic acid is made to react directly with the amine in the presence or absence of a solvent and condensing agent (this method is the di-substituted one called "aminolysis method") or (4) a mixed acid anhydride of an octadecadienoic acid of the formula:

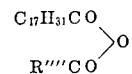

(wherein R''''is an alkyl or halalkyl radical having one to 20 carbon atoms) is made to react with the amine in the presence of a basic condensing catalyst.

1. There have already been various researches wherein dicyclohexyl carbodiimide is used in synthesizing polypeptide. But there has never been a report that an amide is synthesized by using such higher fatty acid to produce an antiatherosclerosis agent, and therefore the process of the present invention is significant. Especially, the process of the present invention can be said to be very advantageous because of the fact that the desired product is readily isolated by filtering and separating the urea precipitated when the reaction has been completed, without any special operation and that the said urea can be used again after being regenerated by such treatment as dehydration.

For the di-substituted carbodiimide to be used in the process of the present invention, there may be exemplified dicyclohexylcarbodiimide, diisopropylcarbodiimide, diphenylcarbodiimide and any other dialkyl-, dicyclalkyl- or di-substituted phenyl-carbodiimide. Any of them is equally useful in the process of the present invention.

In carrying out the process, linoleic acid, a corresponding amine and di-substituted carbodiimide, for example, are separately dissolved in an organic solvent, for example, such aromatic hydrocarbon organic solvent as benzene or toluene, such hydrocarbon solvent as n-hexane, cycloalkane, petroleum ether or gasoline, such ether solvent as dioxane or tetrahydrofuran or such alkyl halide solvent as chloroform, ethylene dichloride or carbon tetrachloride or such ester solvent as methyl, ethyl, propyl or butylacetate. These solutions are mixed at once at the room temperature or under cooling when heat generation is severe so as to be of about 1 in the mol ratio, and the mixture is stirred as required and is then allowed to stand at the room temperature for about 3 to 24 hours, whereupon the corresponding urea which is a byproduct of the reaction will be precipitated. After the precipitate is filtered off, the desired product will be able to be obtained from the filtrate. Further, the excess di-substituted carbodiimide may be decomposed with acetic acid or the like as required.

2. The reaction for condensing an organic amine with an acid halide is also known. However, so far as we know, there has been no report on the production of antiatherosclerosis agents by utilizing this process. We have found that, by using this process, an amide derivative which is useful as an antiatherosclerosis agent can be obtained at a favorable yield under a mild nonoxidative condition.

Even when an excess of such basic condensing agent as such caustic alkali as caustic lithium soda or potash, such alkaline earth hydroxide as calcium or barium hydroxide, such alkali carbonate as lithium, sodium or potassium carbonate, such alkaline earth carbonate as calcium or barium carbonate, such tertiary amine as trimethylamine, dimethylaniline, pyridine, picoline, or an excess of the starting amine or any of the above-mentioned amines is used, the object of the invention will be able to be attained.

As for the solvent in this reaction, is used water, such organic ketone as acetone, methylethyl ketone or methylisobutyl ketone, such ester as methyl acetate, ethyl acetate, propyl acetate or butyl acetate, such ether as ethyl ether, propyl ether, tetrahydrofuran or dioxane, such hydrocarbon solvent as n-hexane, cyclohexane, benzene or toluene, such alkyl halide as ethylene dichloride, chloroform or carbon tetrachloride, such tertiary amine as dimethyl formamide, pyridine or picoline or any of the starting material amines as alone or as properly mixed.

Any temperature up to near the boiling point of the solvent used can be applied for the reaction Further, it is desirable that the reaction is conducted in a stream of such inert gas as nitrogen or helium.

3. The aminolysis method shall now be explained. Any of such alcoholates of alkali metals as lithium methylate, lithium ethylate, sodium methylate, sodium ethylate and potassium-t-butylate may be effectively used as a basic catalyst to be used as required in the process of the present invention. Furthermore, even if an excess of any other basic catalyst, for example, such tertiary amine as pyridine, picoline, lutidine, trimethylamine or N,N-dimethylaniline or an excess of the corresponding starting amine is used, the desired compound is obtained. Further, even when no catalyst is used, the desired compound is able to be obtained. The desired reaction will proceed even without any solvent, although a solvent may be used if desired. The solvent may be any of not only such alcohols as methanol and ethanol, such aromatic hydrocarbons as benzene and toluene and such aliphatic hydrocarbons as cyclohexane and n-hexane but also other inert organic solvents.

A typical mode of operation of the reaction shall now be explained. For example, a linoleic acid ester and an amine are mixed together. If desired, an organic solvent is added to the mixture. No catalyst is added thereto or, as required, a basic catalyst is added to the mixture. When the mixture is allowed to stand or heated with stirring at a temperature from the room temperature to about 400° C. for 3 hours to 1 month, the objective product is produced at a favorable yield. In such case, if such inert gas as helium or nitrogen is used, undesirable oxidation and coloring is able to be prevented. Further, the reaction time can be reduced by carrying out the reaction while heating the reaction mixture above the boiling point of the amine in an autoclave or by removing the alcohol produced during the reaction out of the reaction system.

Generally speaking the aminolysis reaction per se is a known method. However, the utilization of this process for producing antiatherosclerosis agents has never been known Specifically, when the reaction is carried out preferably in the absence of a solvent, the process will be remarkably simplified. That is to say, when the alkyl octadecadienoate and amine are merely stirred and heated, the reaction will proceed smoothly After the end of the reaction, the excess amine or unreacted ester is distilled off under a reduced pressure, whereupon the desired product is easily obtained The amide thus obtained can be easily purified by distillation.

The present invention shall now be explained in detail with reference to the following examples which are given only for illustration and not for limitation of the invention in any way

EXAMPLE 1

Ten g. of linoleic acid, 5 g. of o-methoxycyclohexylamine and 9 g. of dicyclohexylcarbodiimide were mixed in 20 ml. of benzene and the mixture was allowed to stand over night at the room temperature. The excess dicyclohexylcarbodiimide was decomposed with acetic acid and then the resulting reaction mixture was filtered. The filtrate was washed successively with a 5 percent aqueous solution of hydrochloric acid, a 5 percent aqueous solution of sodium carbonate and water, dried over anhydrous sodium sulfate and was then concentrated. The desired compound (11 g.) was obtained by distillation at 190° C. to 195° C. under 0.1 mm. Hg, $n_D^{24.5}$ 1.5090.

Elementary analysis:

| | Calculated | Found |
|---|---|---|
| C | 76.67% | 76.98% |
| H | 11.58 | 11.60 |
| N | 3.58 | 3.62 |

The same procedure as example 1 was repeated except various other amines and solvents were used. The following table indicates the results together with the amines and solvents used. In the table, DCCD indicates dicyclohexylcarbodiimide, DFCD indicates diphenylcarbodiimide, DBCD indicates dibenzylcarbodiimide and DICD indicates diisopropylcarbodiimide. In the same table "C'd" means "calculated" while "F'd" means "found."

| Amine | Solvent | B.P. °C./mm.Hg | $n_D$ °C. | Analysis Calculated C | H | N | Found C | H | N | Dehydrating agent |
|---|---|---|---|---|---|---|---|---|---|---|
| Example 2. NH$_2$—⬡—OCH$_3$ | Benzene | 190–195/0.1 | 25, 1.4848 | 76.67 | 11.58 | 3.58 | 76.77 | 11.78 | 3.79 | DCCD |
| 3. NH$_2$—⬡—OC$_2$H$_5$ | ...do..... | 192–195/0.1 | 24, 1.4851 | 76.98 | 11.68 | 3.45 | 76.82 | 11.77 | 3.55 | DCCD |
| 4. NH$_2$CH(CH$_3$)—⬢ | Tetrahydrofuran | 200–205/0.05 | 21.5, 1.4901 | 81.40 | 10.77 | 3.65 | 80.89 | 10.69 | 3.94 | DCCD |
| 5. NH(CH$_2$—⬢)$_2$ | CCl$_4$ | 208–213/0.03 | 24, 1.5155 | 83.60 | 9.87 | 3.05 | 83.87 | 9.97 | 3.23 | DFCD |
| 6. NH$_2$CH$_2$—⬢(o-CH$_3$) | Ethylene dichloride | 188–193/0.02 | 27, 1.4982 | 81.40 | 10.77 | 3.65 | 81.42 | 11.05 | 3.68 | DCCD |
| 7. NH$_2$—CH$_2$—⬢(m-CH$_3$) | Benzene | 204–209/0.06 | 27, 1.5027 | 81.40 | 10.77 | 3.65 | 81.57 | 10.81 | 3.69 | DBCD |
| 8. NH$_2$—CH$_2$—⬢—CH$_3$ | ...do..... | 203–206/0.06 | 27, 1.4953 | 81.40 | 10.77 | 3.65 | 81.62 | 10.99 | 3.68 | DCCD |
| 9. NH$_2$—CH$_2$—⬢(o-OCH$_3$) | Ether | 190–203/0.03 | 27, 1.4952 | 78.14 | 10.34 | 3.51 | 78.04 | 10.23 | 3.38 | DCCD |
| 10. NH$_2$CH$_2$—⬢—OCH$_3$ | Benzene | 208–210/0.04 | .... ........ | 78.14 | 10.34 | 3.51 | 78.58 | 10.62 | 3.58 | DICD |
| 11. NH$_2$CH$_2$—⬢(o-OH) | Ether | 205–211/0.02 | 30, 1.4860 | 77.87 | 10.20 | 3.63 | 77.72 | 10.21 | 3.76 | DCCD |
| 12. NH$_2$CH$_2$—⬢—OH | ...do..... | 204–209/0.02 | 30, 1.4863 | 77.87 | 10.20 | 3.63 | 77.89 | 10.44 | 3.79 | DCCD |
| 13. NH$_2$CH$_2$—⬡—OCH$_3$ | ...do..... | 185–190/0.08 | 29, 1.4851 | 76.67 | 11.58 | 3.58 | 76.71 | 11.90 | 3.78 | DCCD |
| 14. NH$_2$—⬢(CF$_3$) | ...do..... | 200–203/0.03 | 29, 1.4833 | 73.71 | 8.85 | 3.44 | 74.51 | 8.39 | 3.50 | DCCD |

EXAMPLE 15

N-cyclohexyl linoleamide

A mixture of 10 g. of linoleic acid, 4 g. of cyclohexylamine, 0.2 g. of p-toluene sulfonic acid and 30 ml. of toluene was refluxed for 8 hours using a water separator. After the conclusion of the reaction, the toluene solution was washed with an 5 percent aqueous solution of hydrochloric acid, a 10 percent aqueous solution of sodium carbonate and water successively and was then dried. The toluene was removed and the product was then distilled, to obtain 10 g. of N-cyclohexyl linoleamide, b.p. 180°–181° C./0.02 mm. Hg, $n_D^{24}$ 1.4890.

Elementary analysis:
Calculated    C, 79.71%   H, 11.99%   N, 3.87%
Found         C, 79.42%   H, 12.08%   N, 3.80%

EXAMPLE 16

A mixture of 10 g. of linoleic acid and 5 g. of α-methylbenzylamine was heated at 200° C. in an autoclave for 6 hours. The reaction mixture was distilled at 203°–209° C./0.09 mm. Hg, $n_D^{28}$ 1.4930, yield 10 g.

Analysis:
Calculated    C, 81.40%   H, 10.77%   N, 3.65%
Found         C, 81.56%   H, 10.91%   N, 3.78%

EXAMPLE 17

A solution of 15 g. of linoleic acid chloride in 20 ml. of tetrahydrofuran was added dropwise to a mixture of 5.8 g. of 2-methylcyclohexylamine, 6 g. of potassium carbonate and 100 ml. of methylisobutyl ketone under vigorous stirring during a period of 30 minutes at 0° C. to 5° C. After the completion of the addition, the mixture was stirred at the room temperature for 2 hours and at 70° C. for 4 hours. Ice water was added thereto, and an upper layer of the mixture was washed with a 5 percent aqueous solution of hydrochloric acid, a 5 percent aqueous solution of sodium carbonate and water successively and dried over anhydrous sodium sulfate and then concentrated and distilled, to obtain 16.1 g. of the objective product (b.p. 178 to 182° C./0.04 mm. Hg, $n_D^{30}$ 1.4844).

Elementary analysis:
|   | Calculated | Found |
|---|---|---|
| C | 79.93% | 80.00% |
| H | 12.08 | 12.41 |
| N | 3.73 | 3.81 |

EXAMPLE 18

A solution of 15 g. of linoleic acid chloride in 20 ml. of ether was added dropwise to a mixture of 7 g. of 4-methoxycyclohexylamine, 4 g. of trimethylamine and 50 ml. of ether at 0° to 5° C. After the completion of the addition, the mixture was stirred at the room temperature for 2 hours and then refluxed for 4 hours. When it was then treated in the same manner as in example 1, 16.2 g. of the objective product (b.p. 188 to 192° C./0.03 mm. Hg, $n_D^{24}$ 1.4850) were obtained.

Elementary analysis:
|   | Calculated | Found |
|---|---|---|
| C | 76.67% | 76.91% |
| H | 11.58 | 11.79 |
| N | 3.38 | 3.90 |

In the same manner as in the preceding examples various amides were produced using various amines, solvents and bases as indicated in the following table which also shows the results obtained. In the table, the various abbreviations have the following significances:

MIBK : methylisobutylketone
THF  : tetrahydrofuran
TMA  : trimethylamine
TEA  : triethylaniline
DEA  : diethylaniline
DMA  : dimethylaniline
A    : same amine as used as the starting amine.

| Example | Amine | Solvent | Base | Amide formed C₁₇H₃₁— | B.P. °C./mm. Hg | $n_L^\circ$ C. | Calculated C | Calculated H | Calculated N | Found C | Found H | Found N |
|---|---|---|---|---|---|---|---|---|---|---|---|---|
| 19 | NH₂—C₆H₄—CH₃ (para-CH₃) | Acetone | K₂CO₃ | —CONH—C₆H₄—CH₃ | 180–183/0.03 | 32, 1.4844 | 79.93 | 12.08 | 3.73 | 80.03 | 12.00 | 4.00 |
| 20 | NH₂—C₆H₄—CH₃ | Ether | TMA | —CONH—C₆H₄—CH₃ | 181–184/0.03 | 32, 1.4850 | 79.93 | 12.08 | 3.73 | 80.00 | 12.13 | 3.98 |
| 21 | NH₂—C₆H₄—OCH₃ (OCH₃) | Benzene | A | —CONH—C₆H₄—OCH₃ | 194–200/0.04 | 30, 1.5088 | 76.67 | 11.58 | 3.58 | 76.75 | 11.66 | 3.72 |
| 22 | NH₂—C₆H₄—OCH₃ | Acetone | K₂CO₃ | —CONH—C₆H₄—OCH₃ | 194–198/0.03 | 31, 1.5070 | 76.67 | 11.58 | 3.58 | 76.81 | 11.71 | 3.81 |
| 23 | NH₂—C₆H₄—OC₂H₅ | MIBK | K₂CO₃ | —CONH—C₆H₄—OC₂H₅ | 192–195/0.05 | 30, 1.4848 | 76.98 | 11.68 | 3.45 | 77.05 | 11.72 | 3.72 |

| | Amine | Solvent | Base | Amide formed C₁₇H₃₁— | B.P. °C./mm. Hg | n_L °C. | Calculated C | Calculated H | Calculated N | Found C | Found H | Found N |
|---|---|---|---|---|---|---|---|---|---|---|---|---|
| 24 | 4-aminocyclohexanol (NH₂-C₆H₁₀-OH) | Ether | TEA | —CONH-cyclohexyl-OH | 190–199/0.03 | 30, 1.4860 | 76.34 | 11.48 | 3.71 | 76.49 | 11.68 | 3.81 |
| 25 | 4-aminocyclohexanol | Toluene | Pyridine | —CONH-cyclohexyl-OH | 188–197/0.04 | 30, 1.4860 | 76.34 | 11.48 | 3.71 | 76.52 | 11.70 | 3.75 |
| 26 | 4-aminocyclohexanol | THF | ....do.... | —CONH-cyclohexyl-OH | 190–202/0.04 | 30, 1.4863 | 76.34 | 11.48 | 3.71 | 76.55 | 11.58 | 3.79 |
| 27 | NH₂CH(CH₃)-C₆H₄-OH | MIBK | Ca(OH)₂ | —CONHCO-C₆H₄-CH₃ | 200–204/0.07 | 30, 1.4921 | 81.40 | 10.77 | 3.65 | 81.73 | 11.01 | 3.67 |
| 28 | NH₂CH₂-C₆H₄-CH₃ | Toluene | DEA | —CONHCH₂-C₆H₄-CH₃ | 192–201/0.03 | 30, 1.4980 | 81.40 | 10.77 | 3.65 | 81.65 | 10.98 | 3.82 |
| 29 | NH₂CH₂-C₆H₄-CH₃ | THF | NaOH | —CONHCH₂-C₆H₄-CH₃ | 200–203/0.07 | 27, 1.5022 | 81.40 | 10.77 | 3.65 | 81.64 | 10.89 | 3.84 |
| 30 | NH₂CH₂-C₆H₄-CH₃ | Acetone | K₂CO₃ | —CONHCH₂-C₆H₄-CH₃ | 203–206/0.05 | 30, 1.4945 | 81.40 | 10.77 | 3.65 | 81.59 | 10.95 | 3.79 |
| 31 | NH₂CH₂-C₆H₄-OCH₃ | Benzene | DMA | —CONHCH₂-C₆H₄-OCH₃ | 192–198/0.02 | 30, 1.4943 | 78.14 | 10.34 | 3.51 | 78.37 | 10.63 | 3.72 |
| 32 | NH₂CH₂-C₆H₄-OCH₃ | Ether | Pyridine | —CONHCH₂-C₆H₄-OCH₃ | 205–211/0.03 | ........ | 78.14 | 10.34 | 3.51 | 78.40 | 10.62 | 3.69 |
| 33 | NH₂CH₂-C₆H₄-OH | MIBK | Na₂CO₃ | —CONHCH₂-C₆H₄-OH | 208–211/0.03 | 32, 1.4852 | 77.87 | 10.20 | 3.63 | 78.00 | 10.44 | 3.88 |
| 34 | NH(CH₂-C₆H₅)₂ | Acetone | A | —CON(CH₂-C₆H₅)₂ | 207–213/0.03 | 31, 1.5160 | 83.60 | 9.87 | 8.05 | 83.88 | 10.05 | 3.09 |
| 35 | NH₂-C₆H₄-CF₃ | Pyridine | Pyridine | —CONH-C₆H₄-CF₃ | 199–202/0.03 | 32.5, 1.4840 | 73.71 | 8.85 | 3.44 | 74.51 | 8.25 | 3.59 |

EXAMPLE 36

A mixture of 10 g. of methyl linoleate and 10 g. of methylamine was stirred in an autoclave at 100° C. for 24 hours. When the reaction mixture was distilled, 10 g. of the objective product of a boiling point of 178° to 180° C./0.03 mm. Hg were obtained.

EXAMPLE 37

A mixture of 10 g. of ethyl linoleate and 5 g. of dodecylamine was stirred in a stream of nitrogen at 150° C. for 30 hours. Ethanol was removed out of the reaction system. After the completion of the reaction, the reaction product was taken up in ether and the ether solution was washed with an aqueous solution of hydrochloric acid and water successively and was dried over anhydrous sodium sulfate to obtain 12 g. of the objective compound.

Elementary analysis:

|   | Calculated | Found |
|---|---|---|
| C | 80.47% | 80.39% |
| H | 12.83 | 12.58 |
| N | 3.13 | 3.43 |

EXAMPLE 38

A mixture of 10 g. of methyl linoleate and 10 g. of allylamine was heated at 100° C. for 3 hours in the presence of 0.3 g. of sodium methylate and in an autoclave. There were obtained 10 g. of the objective compound of a boiling point of 180°–183° C./0.02 mm. Hg and $n_D^{31}$ 1.4828.

EXAMPLE 39

A mixture of 10 g. of methyl linoleate and 10 g. heptylamine was stirred at 140° to 150° C. for 35 hours. Methanol generated during the reaction was removed out of the reaction system by distillation, and 11 g. of the objective compound (b.p. 200° to 205° C./0.02 mm. Hg, $n_D^{23}$ 1.4870) were obtained.

Elementary analysis:

|   | Calculated | Found |
|---|---|---|
| C | 79.93% | 79.90% |
| H | 12.8 | 12.31 |
| N | 3.73 | 3.99 |

EXAMPLE 40

A mixture of 10 g. of t-butyl linoleate, 10 g. of hexamethylene imine and 0.1 g. of potassium t-butylate was heated at 140° C. for 1 hour while distilling off t-butanol, and there were obtained 12 g. of the objective compound (b.p. 194° to 197° C./0.08 mm. Hg, $n_D^{30}$ 1.4844).

Elementary analysis:

|   | Calculated | Found |
|---|---|---|
| C | 79.71 % | 79.49 % |
| H | 11.99 | 12.01 |
| N | 3.87 | 4.01 |

The results of reactions carried out in the same manner are shown in the following table A and the physical properties of the compounds obtained are shown in table B:

TABLE A

| Example | Ester, grams | | Amine, grams | | Time, ° C. | h. | Catalyst | Amide $C_{17}H_{31}CO$ |
|---|---|---|---|---|---|---|---|---|
| 41 | $CH_3$ | 10 | $C_2H_5NH_2$ | | 10 | 30 | 100 | $-NHC_2H_5$ |
| 42 | $CH_3$ | 10 | $(CH_3)_2CHNH_2$ | | 10 | 100 | 30 | $-NHCH(CH_3)_2$ |
| 43 | $CH_3$ | 10 | $(CH_3)_2CHCH_2NH_2$ | | 10 | 100 | 30 | $-NHCH_2CH(CH_3)_2$ |
| 44 | $CH_3$ | 10 | $(CH_3)_2NH$ | | 10 | 100 | 30 | $-N(CH_3)_2$ |
| 45 | $CH_3$ | 10 | $(C_2H_5)_2NH$ | | 10 | 100 | 32 | $-N(C_2H_5)_2$ |
| 46 | $CH_3$ | 10 | $[(CH_3)_2CH]_2NH$ | | 10 | 100 | 35 | $-N[CH(CH_3)_2]_2$ |
| 47 | $CH_3$ | 10 | $(CH_2=CH-CH_2)_2NH$ | | 10 | 110 | 30 | $-N(CH_2CH=CH_2)_2$ |
| 48 | $CH_3$ | 10 | cyclopentyl-$NH_2$ | | 5 | 110 | 30 | $-NH-$cyclopentyl |
| 49 | $C_2H_5$ | 10 | cyclohexyl-$NH_2$ | | 5 | 140 | 38 | $-NH-$cyclohexyl |
| 50 | $C_2H_5$ | 10 | $CH_3-$cyclohexyl$-NH_2$ | | 5 | 140 | 3 | $C_2H_5ONa$ | $-NH-$cyclohexyl$-CH_3$ |
| 51 | $CH_3$ | 10 | (2-methylcyclohexyl)$-NH_2$ | | 5 | 140 | 35 | $-NH-$(2-methylcyclohexyl) |

TABLE A

| Example | Ester, grams | Amine, grams | Time, h. | °C. | Catalyst | Amide $C_{17}H_{31}CO-$ |
|---|---|---|---|---|---|---|
| 52 | $CH_3$ 10 | 2-methylcyclohexylamine | 5 | 140 | 30 | —NH—(2-methylcyclohexyl) |
| 53 | $CH_3$ 10 | 2-hydroxycyclohexylamine | 5 | 140 | 35 | —NH—(2-hydroxycyclohexyl) |
| 54 | $CH_3$ 10 | 3-hydroxycyclohexylamine (OH meta to $NH_2$) | 5 | 145 | 36 | —NH—(3-hydroxycyclohexyl) |
| 55 | $CH_3$ 10 | $HO-C_6H_{10}-NH_2$ (4-hydroxycyclohexylamine) | 5 | 140 | 37 | —NH—$C_6H_{10}$—OH |
| 56 | t-Bu 10 | $CH_3O-C_6H_{10}-NH_2$ | 5 | 140 | 3 | Kot-Bu | —NH—$C_6H_{10}$—$OCH_3$ |
| 57 | $CH_3$ 10 | $C_2H_5O-C_6H_{10}-NH_2$ | 5 | 140 | 38 | —NH—$C_6H_{10}$—$OC_2H_5$ |
| 58 | $CH_3$ 10 | 2-methoxycyclohexylamine | 5 | 150 | 35 | —NH—(2-methoxycyclohexyl) |
| 59 | $CH_3$ 10 | N-methylcyclohexylamine | 5 | 140 | 40 | —N($CH_3$)—cyclohexyl |
| 60 | $CH_3$ 10 | HN (pyrrolidine) | 5 | 140 | 40 | —N (pyrrolidinyl) |
| 61 | $CH_3$ 10 | HN (piperidine) | 5 | 140 | 35 | —N (piperidinyl) |
| 62 | $CH_3$ 10 | HN—O (morpholine) | 5 | 140 | 37 | —N—O (morpholinyl) |
| 63 | $CH_3$ 10 | $H_2N-C_6H_4-CH_3$ (p-toluidine) | 5 | 180 | 40 | —HN—$C_6H_4$—$CH_3$ |
| 64 | $CH_3$ 10 | $H_2N-C_6H_4-CH_3$ (o-toluidine) | 5 | 180 | 47 | —HN—$C_6H_4$—$CH_3$ (o) |
| 65 | $CH_3$ 10 | $NH_2-C_6H_4-CH_3$ (m-toluidine) | 5 | 190 | 50 | —HN—$C_6H_4$—$CH_3$ (m) |
| 66 | $CH_3$ 10 | $NH_2-C_6H_4-C(CH_3)_3$ | 5 | 190 | 50 | —HN—$C_6H_4$—$C(CH_3)_3$ |
| 67 | $CH_3$ 10 | $NH_2-C_6H_2(CH_3)_3$ (mesidine) | 5 | 180 | 40 | —HN—$C_6H_2(CH_3)_3$ |
| 68 | $CH_3$ 10 | $HN(CH_3)-C_6H_5$ (N-methylaniline) | 5 | 180 | 40 | —N($CH_3$)—$C_6H_5$ |
| 69 | $CH_3$ 10 | $HN(C_2H_5)-C_6H_4-CH_3$ | 5 | 180 | 40 | —N($C_2H_5$)—$C_6H_4$—$CH_3$ |

TABLE A

| Example | Ester, grams | Amine, grams | Time, h. | °C. | Catalyst | Amide C₁₇H₃₁CO— |
|---|---|---|---|---|---|---|
| 70 | CH₃ 10 | HN(C₆H₅)₂ | 5 | 180 | 40 | —N(C₆H₅)₂ |
| 71 | CH₃ 10 | NH₂—C₆H₄—Cl (o) | 10 | 140 | 40 | —NH—C₆H₄—Cl (o) |
| 72 | CH₃ 10 | NH₂—C₆H₄—Cl (m) | 10 | 140 | 40 | —NH—C₆H₄—Cl (m) |
| 73 | CH₃ 10 | NH₂—C₆H₄—Cl (p) | 10 | 140 | 40 | —NH—C₆H₄—Cl (p) |
| 74 | CH₃ 10 | NH₂—C₆H₃(CH₃)(Cl) | 10 | 140 | 40 | —NH—C₆H₃(CH₃)(Cl) |
| 75 | CH₃ 10 | NH₂—C₆H₃(CH₃)(Cl) | 10 | 140 | 40 | —NH—C₆H₃(CH₃)(Cl) |
| 76 | CH₃ 10 | NH₂—C₆H₃(Cl)(Cl) | 10 | 140 | 40 | —NH—C₆H₃(Cl)(Cl) |
| 77 | CH₃ 10 | NH₂—C₆H₄—Br | 10 | 140 | 40 | —NH—C₆H₄—Br |
| 78 | CH₃ 10 | NH₂—C₆H₄—F | 10 | 140 | 40 | —NH—C₆H₄—F |
| 79 | CH₃ 10 | NH₂—C₆H₄—CF₃ | 10 | 140 | 40 | —NH—C₆H₄—CF₃ |
| 80 | CH₃ 10 | NH₂—C₆H₃(Cl)(CF₃) | 10 | 140 | 40 | —NH—C₆H₃(Cl)(CF₃) |
| 81 | CH₃ 10 | NH₂—C₆H₄—F | 10 | 140 | 40 | —NH—C₆H₄—F |
| 82 | CH₃ 10 | NH₂—C₆H₄—OH | 5 | 140 | 40 | —NH—C₆H₄—OH |
| 83 | CH₃ 10 | NH₂—C₆H₄—OH | 5 | 140 | 40 | —NH—C₆H₄—OH |
| 84 | CH₃ 10 | NH₂—C₆H₄—OCH₃ | 5 | 140 | 40 | —NH—C₆H₄—OCH₃ |
| 85 | CH₃ 10 | NH₂—C₆H₃(OCH₃)(Cl) | 5 | 140 | 40 | —NH—C₆H₃(OCH₃)(Cl) |
| 86 | CH₃ 10 | NH₂CH₂—C₆H₅ | 5 | 140 | 40 | —NHCH₂—C₆H₅ |
| 87 | CH₃ 10 | NH(CH₂—C₆H₅)₂ | 5 | 140 | 40 | —N(CH₂—C₆H₅)₂ |

TABLE A

| Example | Ester, grams | Amine, grams | Time, h. | °C. | Catalyst | Amide $C_{17}H_{31}CO$ |
|---|---|---|---|---|---|---|
| 88 | $CH_3$ | 10 $NH_2CH(CH_3)-C_6H_5$ | 5 | 140 | 40 | $-NH-CH(CH_3)-C_6H_5$ |
| 89 | $CH_3$ | 10 $NH_2-CH_2-C_6H_4(o-CH_3)$ | 5 | 140 | 40 | $-NHCH_2-C_6H_4(o-CH_3)$ |
| 90 | $CH_3$ | 10 $NH_2CH_2-C_6H_4(m-CH_3)$ | 5 | 140 | 40 | $-NHCH_2-C_6H_4(m-CH_3)$ |
| 91 | $CH_3$ | 10 $NH_2CH_2-C_6H_4-CH_3$ (p) | 5 | 140 | 40 | $-NHCH_2-C_6H_4-CH_3$ (p) |
| 92 | $CH_3$ | 10 $NH_2CH_2-C_6H_4(o-OCH_3)$ | 5 | 140 | 40 | $-NHCH_2-C_6H_4(o-OCH_3)$ |
| 93 | $CH_3$ | 10 $NH_2CH_2-C_6H_4-OCH_3$ (p) | 5 | 140 | 40 | $-NHCH_2-C_6H_4-OCH_3$ (p) |
| 94 | $CH_3$ | 10 $NH_2CH_2-C_6H_4(o-OH)$ | 5 | 140 | 40 | $-NHCH_2-C_6H_4(o-OH)$ |

TABLE B

| Example | B.P. °C./mm.Hg or M.P. | $n_D$ °C. | Calculated C | Calculated H | Calculated N | Found C | Found H | Found N |
|---|---|---|---|---|---|---|---|---|
| 41 | 138–143/0.02 | 19, 1.4687 | 78.11 | 12.13 | 4.56 | 78.21 | 12.43 | 4.78 |
| 42 | 164–169/0.02 | 25, 1.4720 | 78.44 | 12.23 | 4.36 | 78.47 | 12.50 | 4.51 |
| 43 | 164–169/0.02 | 25, 1.4718 | 78.74 | 12.32 | 4.17 | 79.01 | 12.51 | 4.30 |
| 44 | 141–143/0.02 | 25, 1.4730 | 78.18 | 12.05 | 4.56 | 78.30 | 12.19 | 4.72 |
| 45 | 165–171/0.04 | 25, 1.4721 | 78.74 | 12.32 | 4.17 | 78.91 | 12.51 | 4.33 |
| 46 | 172–178/0.02 | 25, 1.4743 | 79.34 | 12.40 | 3.86 | 79.52 | 12.66 | 3.98 |
| 47 | 196–203/0.03 | 25, 1.4830 | 80.22 | 11.42 | 3.90 | 80.75 | 11.39 | 3.96 |
| 48 | 175–178/0.03 | 30, 1.4844 | 79.47 | 11.89 | 4.03 | 79.47 | 12.03 | 3.81 |
| 49 | 199–203/0.03 | 30, 1.4850 | 79.71 | 11.99 | 3.87 | 79.68 | 12.23 | 4.01 |
| 50 | 178–182/0.02 | 32.5, 1.4851 | 79.93 | 12.08 | 3.73 | 80.03 | 12.01 | 4.11 |
| 51 | 178–183/0.02 | 31, 1.4845 | 79.93 | 12.08 | 3.73 | 80.07 | 12.30 | 3.94 |
| 52 | 161–163/0.02 | 30, 1.4843 | 79.93 | 12.08 | 3.73 | 80.35 | 12.41 | 4.05 |
| 53 | 188–192/0.01 | 30, 1.4863 | 76.34 | 11.48 | 3.71 | 76.57 | 11.73 | 4.00 |
| 54 | 190–193/0.06 | 30, 1.4871 | 76.34 | 11.48 | 3.71 | 76.02 | 12.00 | 4.13 |
| 55 | 191–194/0.05 | 31, 1.4869 | 76.34 | 11.48 | 3.71 | 76.48 | 11.54 | 4.09 |
| 56 | 185–190/0.05 | 30.5, 1.4849 | 76.67 | 11.58 | 3.58 | 76.78 | 12.03 | 4.01 |
| 57 | 193–196/0.1 | 30.5, 1.4847 | 76.98 | 11.68 | 3.45 | 76.81 | 11.79 | 3.67 |
| 58 | 200–204/0.08 | 31, 1.5081 | 76.67 | 11.58 | 3.58 | 76.48 | 11.98 | 3.89 |
| 59 | 190–193/0.03 | 31, 1.4840 | 79.93 | 12.08 | 3.73 | 80.12 | 12.15 | 4.03 |
| 60 | 200–205/0.03 | 31.5, 1.4813 | 79.22 | 11.79 | 4.20 | 79.43 | 11.77 | 4.31 |
| 61 | 190–193/0.03 | 30, 1.4770 | 79.54 | 11.82 | 4.03 | 79.77 | 12.01 | 4.23 |
| 62 | 194–197/0.07 | 31, 1.4847 | 75.59 | 11.25 | 4.01 | 75.81 | 11.59 | 4.05 |
| 63 | 189–193/0.05 | 31, 1.5000 | 81.30 | 10.57 | 3.79 | 81.52 | 10.59 | 3.91 |
| 64 | 190–195/0.04 | 30, 1.4981 | 81.30 | 10.57 | 3.79 | 81.74 | 10.69 | 3.97 |
| 65 | 190–198/0.05 | 30, 1.4962 | 81.30 | 10.57 | 3.79 | 81.71 | 10.78 | 4.01 |
| 66 | 200–206/0.05 | 30, 1.5022 | 81.75 | 10.95 | 3.41 | 81.92 | 11.05 | 3.67 |
| 67 | 192–197/0.02 | 30, 1.4900 | 81.61 | 10.83 | 3.53 | 81.88 | 10.97 | 3.68 |
| 68 | 191–196/0.02 | 31, 1.4897 | 81.24 | 10.64 | 3.79 | 81.41 | 10.91 | 3.91 |
| 69 | 180–190/0.01 | 32, 1.4875 | 81.61 | 10.83 | 3.53 | 81.93 | 10.99 | 3.41 |
| 70 | 185–192/0.01 | 32, 1.4880 | 83.53 | 9.31 | 3.25 | 83.77 | 10.00 | 3.62 |
| 71 | 185/0.09 | 30.5, 1.4990 | 73.94 | 9.24 | 3.59 | 74.12 | 9.38 | 3.59 |
| 72 | 185–190/0.03 | 27, 1.4980 | 73.94 | 9.24 | 3.59 | 74.41 | 9.45 | 3.88 |
| 73 | 185–190/0.04 | 23, 1.5010 | 73.94 | 9.24 | 3.59 | 74.09 | 9.48 | 3.77 |
| 74 | 185–195/0.03 | 27, 1.4965 | 74.35 | 9.42 | 3.47 | 74.78 | 9.83 | 3.68 |
| 75 | 180–185/0.02 | 25, 1.4927 | 74.35 | 9.42 | 3.47 | 74.81 | 9.33 | 3.61 |
| 76 | 180–191/0.02 | 25, 1.4954 | Cl 23.23 | | | 23.55 | | |
| 77 | 220/0.03 | 24, 1.5250 | 66.36 | 8.29 | 3.23 | 66.21 | 8.32 | 3.90 |
| 78 | 200–210/0.04 | 20, 1.5035 | 77.21 | 9.65 | 3.75 | 78.77 | 10.53 | 3.78 |
| 79 | 200–201/0.04 | 24, 1.4859 | 73.71 | 8.85 | 3.44 | 74.42 | 8.46 | 3.53 |
| 80 | 200–205/0.07 | 21, 1.4883 | 65.57 | 7.65 | 3.06 | 66.30 | 7.99 | 3.23 |
| 81 | 195–200/0.04 | 25, 1.5012 | 77.21 | 9.65 | 3.75 | 78.18 | 10.34 | 3.79 |
| 82 | M.P. 92–94 | | 77.63 | 9.97 | 3.77 | 77.71 | 10.04 | 3.61 |
| 83 | M.P. 94–95 | | 77.63 | 9.97 | 3.77 | 77.81 | 9.99 | 3.83 |
| 84 | M.P. 55–57 | | 77.92 | 10.13 | 3.64 | 77.81 | 10.45 | 3.81 |
| 85 | 190–195/0.05 | 31.5, 1.4923 | 71.51 | 9.06 | 3.34 | 71.77 | 9.13 | 3.54 |
| 86 | 190–192/0.1 | 26, 1.4900 | 81.24 | 10.64 | 3.79 | 81.44 | 10.67 | 3.89 |
| 87 | 208–218/0.03 | 25, 1.5155 | 83.60 | 9.87 | 3.05 | 83.87 | 9.97 | 3.23 |
| 88 | 203–207/0.15 | 27, 1.4929 | 81.40 | 10.77 | 3.65 | 81.87 | 11.00 | 3.72 |
| 89 | 188–200/0.04 | 27, 1.4982 | 81.40 | 10.77 | 3.65 | 81.42 | 10.50 | 3.68 |
| 90 | 204–216/0.07 | 27, 1.5026 | 81.40 | 10.77 | 3.65 | 81.28 | 11.28 | 3.60 |
| 91 | 203–207/0.06 | 27, 1.4949 | 81.40 | 10.77 | 3.65 | 81.62 | 10.51 | 3.74 |
| 92 | 190–200/0.03 | 27, 1.4952 | 78.14 | 10.34 | 3.51 | 78.04 | 10.23 | 3.38 |
| 93 | 208–220/0.04 | | 78.14 | 10.34 | 3.51 | 78.58 | 10.80 | 3.58 |
| 94 | 205–211/0.02 | 30, 1.4860 | 77.87 | 10.20 | 3.63 | 78.72 | 10.21 | 3.76 |

EXAMPLE 95

A mixture of 10 g. of ethyl linoleate, 10 g. of dibenzylamine and an ethanol solution of 1.0 g. of sodium was heated at 70° to 85° C. for about 2 hours. Then the same amount of water was added thereto and the mixture was extracted with ether. When the ether part was washed with a 5 percent aqueous solution of hydrochloric acid and water successively and was then dried over anhydrous sodium sulfate, there were obtained 13 g. of the objective compound (b.p. 203° to 207° C./0.04 mm. Hg, $n_D^{31}$ 1.5150).

Elementary analysis:

|   | Calculated | Found |
|---|---|---|
| C | 83.60% | 83.71% |
| H | 9.87 | 10.03 |
| N | 3.05 | 3.22 |

EXAMPLE 96

A mixture of 10 g. of methyl linoleate, 5 g. of α-methylbenzylamine and a methanol solution of 1.2 g. of sodium was heated at 70° C. under 100 mm. Hg for 2 hours while removing off the methanol, there were obtained 12 g. of the objective compound (b.p. 200° to 203° C./0.07 mm. Hg, $n_D^{30}$ 1.4919).

Elementary analysis:

|   | Calculated | Found |
|---|---|---|
| C | 81.40% | 81.77% |
| H | 10.77 | 10.94 |
| N | 3.65 | 3.66 |

EXAMPLE 97

A mixture of 10 g. of methyl linoleate, 5 g. of 2-methoxybenzylamine, 3.7 g. of sodium methylate and 100 ml. of toluene was reacted for about 2 hours while removing off the methanol, and there were obtained 10 g. of the objective compound (b.p. 195 to 201° C./0.03 mm. Hg, $n_D^{25}$ 1.4978.

Elementary analysis:

|   | Calculated | Found |
|---|---|---|
| C | 78.14% | 78.03% |
| H | 10.34 | 10.20 |
| N | 3.51 | 3.79 |

In the same manner various amides as shown in the following table were produced:

EXAMPLE 103

A mixture of 10 g. of methyl linoleate and 10 g. of cyclohexylamine and a solution of 0.2 g. of sodium in 60 ml. of methyl alcohol was allowed to stand at the room temperature for 144 hours. Then water was added thereto and the oil layer was extracted with ether. The ether solution was washed with a 5 percent aqueous solution of hydrochloric acid and then with water, and then dried. When it was concentrated under a reduced pressure and then distilled, there were obtained 7 g. of N-cyclohexyl-linoleamide (b.p. 190°-192° C./0.03 mm. Hg, $n_D^{25}$ 1.4865).

Elementary analysis:

|   | Calculated | Found |
|---|---|---|
| C | 79.71% | 79.94% |
| H | 11.99 | 12.08 |
| N | 3.87 | 3.90 |

EXAMPLE 104

A mixture of 10 g. of methyl linoleate, 5 g. of o-toluidine and a solution of 0.1 g. of sodium in 60 ml. of t-butyl alcohol was allowed to stand at the room temperature for 100 hours. Then it was treated in the same manner as in example 103, there were obtained the desired product, N-2-methylphenyl linoleamide (b.p. 205° to 206° C./0.03 mm. Hg, $n_D^{23}$ 1.5018).

Elementary analysis:

|   | Calculated | Found |
|---|---|---|
| C | 81.30% | 80.99% |
| H | 10.57 | 10.82 |
| N | 3.79 | 3.62 |

EXAMPLE 105

A mixture of 10 g. of linoleic acid methyl ester, 3 g. of diethylamine, powdered KOtBu and 50 ml. of benzene was boiled under stirring for about 20 hours. After it was cooled, the mixture was washed with dilute hydrochloric acid and then with water and was then dried and distilled, to obtain 4 g. of the objective compound (b.p. 160° to 163° C./1.01 mm. Hg, $n_D^{19}$ 1.4690).

Elementary analysis:

|   | Calculated | Found |
|---|---|---|
| C | 78.11% | 78.01% |
| H | 12.13 | 12.01 |
| N | 4.56 | 4.21 |

The compounds obtained in the same manner are shown in table C and their physical constants and yields are shown in table D.

| Ex. | Ester | Amine used NH₂— | Amide formed C₁₇H₃₁CONH— | Calculated C | H | N | Found C | H | N | B.P. °C./mm.Hg. | $n_D$ °C. |
|---|---|---|---|---|---|---|---|---|---|---|---|
| 98 | Et | —CH₂—⌬—CH₃ | —CH₂—⌬—CH₃ | 81.40 | 10.77 | 3.65 | 81.37 | 10.89 | 3.91 | 200–207/0.05 | 32, 1.5019 |
| 99 | Me | —CH₂—⌬—CH₃ | —CH₂—⌬—CH₃ | 81.40 | 10.77 | 3.65 | 81.22 | 10.92 | 3.78 | 203–206/0.05 | 32, 1.4940 |
| 100 | Et | —CH₂—⌬—OCH₃ | —CH₂—⌬—OCH₃ | 78.14 | 10.34 | 3.51 | 78.00 | 10.45 | 3.77 | 209–213/0.03 | 30, 1.4951 |
| 101 | Me | —CH₂—⌬—OH | —CH₂—⌬—OH | 77.87 | 10.20 | 3.63 | 77.69 | 10.41 | 3.81 | 205–209/0.03 | 30, 1.4859 |
| 102 | Me | —⌬—CF₃ | —⌬—CF₃ | 73.71 | 8.85 | 3.44 | 74.91 | 8.29 | 3.59 | 200–203/0.03 | 30, 1.4855 |

| Example | Ester, grams | | Amine, grams | | Catalyst | Solvent | Temperature, °C. | Time, hours | Amide formed $C_{17}H_{31}CO$ |
|---|---|---|---|---|---|---|---|---|---|
| 106 | $C_2H_5$ | 10 | $(CH_3)_2CHNH_2$ | 5 | $LiOCH_3$ | Methanol | 28 | 140 | $-NHCH(CH_3)_2$ |
| 107 | $CH_3$ | 10 | $(C_2H_5)_2NH$ | 5 | $NaOCH_3$ | Benzene | 23 | 150 | $-N(C_2H_5)_2$ |
| 108 | $CH_3$ | 10 | $CH_2=CHCH_2NH_2$ | 5 | $NaOC_2H_5$ | Toluene | 50 | 100 | $-NHCH_2CH=CH_2$ |
| 109 | $C_2H_5$ | 10 | $(CH_2=CHCH_2)_2NH$ | 5 | $KOCH_3$ | Methanol | 22 | 120 | $-N(CH_2CH=CH_2)_2$ |
| 110 | $CH_3$ | 10 | $H_2N$—C$_6H_4$—$CH_3$ | 5 | $LiOC_2H_5$ | Ethanol | 60 | 144 | $-NH$—C$_6H_4$—$CH_3$ |
| 111 | $CH_3$ | 10 | $H_2N$—C$_6H_4$—$C(CH_3)_3$ | 8 | $NaOC_2H_5$ | Benzene | 60 | 120 | $-NH$—C$_6H_4$—$C(CH_3)_3$ |
| 112 | $CH_3$ | 10 | $C_6H_5$NH$CH_3$ | 8 | $NaOCH_3$ | Toluene | 30 | 100 | $-N(C_6H_5)(CH_3)$ |
| 113 | $C_2H_5$ | 10 | $(C_6H_5)_2NH$ | 10 | KOtBu | t-Butanol | 30 | 120 | $-N(C_6H_5)_2$ |
| 114 | $CH_3$ | 10 | $NH_2$—C$_6H_4$—Cl (o-) | 10 | Same | Benzene | 22 | 100 | $-NH$—C$_6H_4$—Cl |
| 115 | $CH_3$ | 10 | $NH_2$—C$_6H_3$(CH$_3$)—Cl | 10 | $NaOCH_3$ | Toluene | 22 | 100 | $-NH$—C$_6H_3$(CH$_3$)—Cl |
| 116 | $CH_3$ | 10 | $NH_2$—C$_6H_4$—OH | 5 | $NaOCH_3$ | Methanol | 22 | 144 | $-NH$—C$_6H_4$—OH |
| 117 | $CH_3$ | 10 | $NH_2$—C$_6H_4$—OCH$_3$ | 5 | Pyridine | Toluene | 60 | 120 | $-NH$—C$_6H_4$—OCH$_3$ |
| 118 | $CH_3$ | 10 | HN$_2$—cyclopentyl | 5 | N-methylpyrrole, $NaOCH_3$ | Methanol | 60 | 140 | $-NH$—cyclopentyl |
| 119 | $CH_3$ | 10 | $NH_2$—C$_6H_{11}$ | 5 | $(CH_3)_3N$ | Benzene | 60 | 100 | $-NH$—C$_6H_{11}$ |
| 120 | $CH_3$ | 10 | $NH_2$—C$_6H_{10}$—CH$_3$ | 5 | KOtBu | do | 30 | 120 | $-NH$—C$_6H_{10}$—CH$_3$ |
| 121 | $C_2H_5$ | 10 | $NH_2$—C$_6H_{10}$—OH | 5 | Same | t-Butanol | 30 | 120 | $-NH$—C$_6H_{10}$—OH |
| 122 | $CH_3$ | 10 | $NH_2$—C$_6H_{10}$—OCH$_3$ | 10 | $NaOCH_3$ | Methanol | 30 | 100 | $-NH$—C$_6H_{10}$—OCH$_3$ |
| 123 | $C_2H_5$ | 10 | HN—pyrrolidinyl | 10 | Same | Toluene | 30 | 100 | $-N$—pyrrolidinyl |
| 124 | $C_2H_5$ | 10 | NH—piperidinyl | 10 | KOtBu | Benzene | 30 | 144 | $-N$—piperidinyl |

| Example | Ester, grams | Amine, grams | | Catalyst | Solvent | Temperature, °C. | Time, hours | Amide formed $C_{17}H_{31}CO-$ |
|---|---|---|---|---|---|---|---|---|
| 125 | $CH_3$ | 10 | HN⟨octagon⟩ | 10 | Same | do | 30 | 100 | -N⟨octagon⟩ |
| 126 | $CH_3$ | 10 | HN⟨octagon-O⟩ | 10 | do | t-Butanol | 30 | 100 | -N⟨octagon-O⟩ |
| 127 | $CH_3$ | 10 | HN-CH_3⟨hexagon⟩ | 10 | do | do | 30 | 120 | -N-CH_3⟨hexagon⟩ |

TABLE D

| Example | B.P. °C./mm. Hg or M.P. | $n_D$ °C. | Calculated | | | Found | | | Yield (grams) |
|---|---|---|---|---|---|---|---|---|---|
| | | | C | H | N | C | H | N | |
| 106 | 161–163/0.02 | 25, 1.4705 | 78.44 | 12.23 | 4.36 | 78.63 | 12.09 | 4.05 | 5.2 |
| 107 | 140–146/0.02 | 22, 1.4746 | 78.11 | 12.05 | 4.56 | 78.33 | 12.29 | 4.83 | 6.0 |
| 108 | 190–192/0.04 | 23, 1.4835 | 79.00 | 11.60 | 4.39 | 79.30 | 11.38 | 4.32 | 6.3 |
| 109 | 199–200/0.03 | 23, 1.4840 | 80.33 | 11.42 | 3.90 | 80.11 | 11.62 | 3.61 | 5.4 |
| 110 | 195–198/0.03 | 22, 1.4981 | 81.30 | 10.57 | 3.79 | 81.52 | 10.81 | 3.91 | 6.1 |
| 111 | 200–203/0.05 | 22, 1.5038 | 81.75 | 10.95 | 3.41 | 82.02 | 11.08 | 3.56 | 8.1 |
| 112 | 195–197/0.03 | 23, 1.4909 | 81.24 | 10.64 | 3.79 | 81.01 | 11.05 | 3.46 | 7.1 |
| 113 | 190–193/0.02 | 23, 1.4888 | 83.53 | 9.51 | 3.25 | 83.79 | 9.89 | 3.07 | 5.2 |
| 114 | 188/0.05 | 23, 1.4992 | 73.94 | 9.24 | 3.59 | 74.50 | 9.81 | 3.88 | 4.8 |
| 115 | 190–195/0.03 | 23, 1.4940 | 74.35 | 9.42 | 3.47 | 74.91 | 10.65 | 3.48 | 4.6 |
| 116 | M.P. 94–95 | | 77.63 | 9.97 | 3.77 | 77.66 | 10.07 | 3.91 | 4.8 |
| 117 | M.P. 56–58 | | 77.92 | 10.13 | 3.64 | 77.61 | 10.31 | 3.49 | 6.0 |
| 118 | 174–176/0.03 | 23, 1.4856 | 79.47 | 11.89 | 4.03 | 79.81 | 11.05 | 3.98 | 5.2 |
| 119 | 200–202/0.02 | 23, 1.4871 | 79.93 | 12.08 | 3.73 | 79.82 | 11.89 | 3.43 | 5.1 |
| 120 | 160–162/0.02 | 23, 1.4852 | 79.93 | 12.08 | 3.73 | 79.71 | 11.91 | 3.65 | 5.0 |
| 121 | 190–191/0.06 | 23, 1.4880 | 76.34 | 11.48 | 3.71 | 76.51 | 11.09 | 3.49 | 6.1 |
| 122 | 190–192/0.05 | 22, 1.4861 | 76.67 | 11.58 | 3.58 | 76.09 | 11.39 | 3.62 | 4.9 |
| 123 | 200, 204/0.03 | 22, 1.4831 | 79.22 | 11.79 | 4.20 | 79.41 | 11.58 | 4.31 | 5.1 |
| 124 | 190–193/0.01 | 20, 1.4778 | 79.54 | 11.82 | 4.20 | 79.82 | 12.09 | 4.40 | 5.5 |
| 125 | 194–195/0.1 | 20, 1.4881 | 79.71 | 11.99 | 3.87 | 79.99 | 12.05 | 4.02 | 4.9 |
| 126 | 200–203/0.05 | 25, 1.4859 | 75.59 | 11.25 | 4.01 | 75.78 | 11.55 | 3.98 | 5.2 |
| 127 | 190–193/0.03 | 22, 1.4871 | 79.93 | 12.08 | 3.73 | 80.05 | 12.03 | 3.91 | 6.0 |

EXAMPLE 128

A mixture of 10 g. of methyl linoleate and 5 g. of cyclohexylamine was heated at 210° C. for 5 hours in an autoclave, to obtain 12 g. of the objective compound (b.p. 200° to 208° C./0.05 mm. Hg).

Elementary analysis:

| | Calculated | Found |
|---|---|---|
| C | 79.71% | 79.90% |
| H | 11.99 | 12.03 |
| N | 3.87 | 3.84 |

EXAMPLE 129

A mixture of 10 g. of conjugated methyl linoleate and 5 g. of cyclohexylamine was heated at 200° C. for 5 hours in an autoclave to obtain 12.1 g. of the objective compound (b.p. 200° to 209° C./0.04 mm. Hg).

Elementary analysis:

| | Calculated | Found |
|---|---|---|
| C | 79.71% | 79.88% |
| H | 11.99 | 12.05 |
| N | 3.87 | 3.61 |

From the ultraviolet and infrared absorption, it was considered that the compound obtained had a conjugated double bonds.

EXAMPLE 130

A mixture of 10 g. of methyl linoleate and 5 g. of o-methylbenzylamine was heated at 210° C. for 7 hours in $N_2$ in an autoclave, to obtain 11.5 g. of the objective compound (b.p. 192° to 210° C./0.06 mm. Hg, $n_D^{27}$ 1.4982).

Elementary analysis:

| | Calculated | Found |
|---|---|---|
| C | 81.40% | 81.61% |
| H | 10.77 | 10.94 |
| N | 3.65 | 3.60 |

EXAMPLE 131

A mixture of 10 g. of conjugated methyl linoleate and 5 g. of p-methoxycyclohexylamine was heated at 150° C. for 40 hours in $N_2$, to obtain 12.0 g. of the objective compound (b.p. 195°–203° C./0.05 mm. Hg).

Elementary analysis:

| | Calculated | Found |
|---|---|---|
| C | 76.67% | 76.81% |
| H | 11.58 | 11.31 |
| N | 3.58 | 3.24 |

In the same manner the following compounds were produced.

| Example | Amides | M.P. °C. | Calculated | | | Found | | |
|---|---|---|---|---|---|---|---|---|
| | | | C | H | N | C | H | N |
| 132 | Conjugated-N-2-methylphenyl linoleamide | 43–46 | 81.24 | 10.64 | 3.79 | 80.92 | 11.08 | 3.89 |
| 133 | Trans-N-2-methylphenyl linoleamide | 54–55 | 81.24 | 10.64 | 3.79 | 81.30 | 10.95 | 3.83 |
| 134 | Trans-N-cyclohexyl linoleamide | 51–52 | 79.71 | 11.99 | 3.87 | 80.00 | 12.27 | 3.85 |

EXAMPLE 135

To a solution of 14 g. of linoleic acid and 5.5 g. of triethylamine in 100 cc. of tetrahydrofuran was added 5.9 g. of ethyl chloracetate under stirring at −10° to −5° C. Then the reacting mixture was further stirred at −5° C. for 20 minutes. There was added 7.7 g. of 2-methylchloroaniline, at −5° C. under stirring into the solution. Then the stirring was continued while the temperature was gradually elevated to the room temperature. The temperature was then gradually elevated and the solution was stirred at 40° C. for 20 minutes. After the solution was cooled, tetrahydrofuran was distilled away under a reduced pressure. The residue was taken up in ether, and washed with a cold dilute hydrochlonic acid, a cold aqueous solution of sodium carbonate and water in turn and was then dried over anhydrous sodium carbonate. When the ether was distilled off and the residue was then distilled under a reduced pressure, there were obtained 12.9 g. (yield 64 percent) of 2-chloro-6-methylphenyl linoleamide (b.p. 210° to 215° C./0.02 mm. Hg), $n_D^{2H}$ 1.5147).

Elementary analysis ($C_{25}H_{38}ONCl$)

| | Calculated | Found |
|---|---|---|
| C | 74.35% | 74.57% |
| H | 9.42 | 9.61 |
| N | 3.47 | 3.42 |
| Cl | 8.80 | 8.67 |

In the same manner the following compounds were produced.

| Amides $C_{17}H_{31}$ CONH— | B.P.° C./mm. Hg. | $n_D°$ C. | Analysis, percent |||||||
|---|---|---|---|---|---|---|---|---|
| | | | Calculated ||| Found |||
| | | | C | H | N | C | H | N |
| 2-Cl, 6-CH$_3$-phenyl | 184–190/0.03 | 31, 1.4910 | 74.35 | 9.42 | 3.47 | 74.51 | 9.67 | 3.53 |
| 4-Br-phenyl | 200–208/0.03 | 26, 1.5249 | 66.36 | 8.29 | 3.23 | 66.71 | 8.42 | 3.27 |
| 4-OH-phenyl | M.P. 92–94 | — | 77.63 | 9.97 | 3.77 | 77.65 | 10.02 | 3.81 |
| 2-OH-phenyl | 203–210/0.06 | 27, 1.4981 | 77.63 | 9.97 | 3.77 | 77.74 | 9.99 | 3.81 |
| 4-OCH$_3$-phenyl | 188–193/0.04 | 30, 1.4920 | 71.51 | 9.06 | 3.34 | 71.79 | 9.11 | 3.32 |
| 2,6-diCl, 4-CH$_3$-phenyl | 180–185/0.01 | 25, 1.4997 | 74.35 | 9.42 | 3.47 | 74.67 | 9.68 | 3.47 |

The effectivenesses of the present octadecadienoic acid amide compounds are set forth below.

| Agents | Blood cholesterol level indexes ||
|---|---|---|
| | 1% administered | 0.2% administered |
| None (control) | 100 | — |
| Linoleic acid | 74–78 | 101–104 |
| $C_{17}H_{31}$CONH—$C_2H_5$ | 72 | 104 |
| $C_{17}H_{31}$CONH—CH(CH$_3$)$_2$ | 67 | 85 |
| $C_{17}H_{31}$CONHCH$_2$CH(CH$_3$)$_2$ | — | 93 |
| $C_{17}H_{31}$CONHCH$_2$CH=CH$_2$ | 28 | 63 |
| $C_{17}H_{31}$CONHC$_{12}$H$_{25}$ | — | 80 |
| $C_{17}H_{31}$CON(CH$_3$)$_2$ | 100 | 105 |
| $C_{17}H_{31}$CON(C$_2$H$_5$)$_2$ | 59 | 82 |
| $C_{17}H_{31}$CON(CH(CH$_3$)$_2$)$_2$ | 76 | 80 |
| $C_{17}H_{31}$CON(CH$_2$CH(CH$_3$)$_2$)$_2$ | 63 | 86 |
| $C_{17}H_{31}$CON(CH$_2$CH=CH$_2$)$_2$ | 41 | 86 |
| $C_{17}H_{31}$CONH—cyclopentyl | 42 | 68 |
| $C_{17}H_{31}$CONH—cyclohexyl | 47 | 55 |
| $C_{17}H_{31}$CONH—cycloheptyl | 90 | 105 |

| Agents | Blood cholesterol level indexes 1% administered | Blood cholesterol level indexes 0.2% administered |
|---|---|---|
| C₁₇H₃₁CONH-C₆H₄(2-CH₃) (cyclohexyl) | 56 | 96 |
| C₁₇H₃₁CONH-C₆H₄(3-CH₃) (cyclohexyl) | 65 | 89 |
| C₁₇H₃₁CONH-C₆H₄-CH₃ (cyclohexyl, 4-CH₃) | 47 | 93 |
| C₁₇H₃₁CON(CH₃)-cyclohexyl | 37 | 54 |
| C₁₇H₃₁CONH-phenyl | 71 | 101 |
| C₁₇H₃₁CONH-phenyl(2-CH₃) | 39 | 50 |
| C₁₇H₃₁CONH-phenyl(3-CH₃) | 58 | 88 |
| C₁₇H₃₁CONH-phenyl-4-CH₃ | 71 | 92 |
| C₁₇H₃₁CONH-phenyl-4-C(CH₃)₃ | 100 | 110 |
| C₁₇H₃₁CONH-phenyl(2,4,6-tri-CH₃) | 33 | 72 |
| C₁₇H₃₁CONHCH₂-phenyl | 52 | 77 |
| C₁₇H₃₁CON(CH₃)-phenyl | 61 | 86 |
| C₁₇H₃₁CON(C₂H₅)-phenyl(3-CH₃) | 54 | 81 |
| C₁₇H₃₁CON(phenyl)₂ | 43 | 66 |
| C₁₇H₃₁CON (pyrrolidine) | 43 | 59 |
| C₁₇H₃₁CON (piperidine) | 75 | 90 |
| C₁₇H₃₁CON (hexamethyleneimine) | — | 82 |
| C₁₇H₃₁CONH-phenyl-Cl | 20 | 58 |
| C₁₇H₃₁CONH-phenyl-OCH₃ | — | 67 |

| Agents | Blood cholesterol level indexes 1% administered | Blood cholesterol level indexes 0.2% administered |
|---|---|---|
| C₁₇H₃₁CONH-C(CH₃)=CH(Cl) | 46 | 61 |
| C₁₇H₃₁CONH-phenyl(CH₃, Cl) | 50 | 63 |
| C₁₇H₃₁CONH-cyclohexyl-OH | 79 | 94 |
| C₁₇H₃₁CONH-cyclohexyl-OH | 64 | 82 |
| C₁₇H₃₁CONH-cyclohexyl-OCH₃ | 60 | 90 |
| C₁₇H₃₁CONH-cyclohexyl-OC₂H₅ | 52 (0.4%) | 80 |
| C₁₇H₃₁CONH-cyclohexyl-OCH₃ | 56 (0.8%) | 75 |
| C₁₇H₃₁CONH-phenyl-CF₃ | 72 | 85 |
| C₁₇H₃₁CONH-phenyl-F | 78 | 93 |
| C₁₇H₃₁CONH-phenyl-F | 80 | 96 |
| C₁₇H₃₁CONH-phenyl-Br | 79 | 86 |
| C₁₇H₃₁CONH(CH₂-phenyl)₂ | 67 | |
| C₁₇H₃₁CONH-phenyl-Cl | — | 67 |
| C₁₇H₃₁CONH-phenyl(Cl, CH₃) | — | 46 |
| C₁₇H₃₁CONH-phenyl(2-Cl, 6-CH₃) | 35 | 44 |
| C₁₇H₃₁CONH-phenyl(CH₃, Cl) | 42 | — |
| C₁₇H₃₁CONH-CH(CH₃)-phenyl | 39 | 78 |
| C₁₇H₃₁CONH-CH₂-phenyl-CH₃ | 55 | — |
| C₁₇H₃₁CONH-CH₂-phenyl-CH₃ | 56 | — |

| Agents | Blood cholesterol level indexes | |
|---|---|---|
| | 1% administered | 0.2% administered |
| $C_{17}H_{31}CONH-CH_2-\text{(phenyl)}-CH_3$ | | 64 |
| $C_{17}H_{31}CONH-CH_2-\text{(phenyl)}-OCH_3$ | | 70 |
| $C_{17}H_{31}CONH-CH_2-\text{(phenyl)}$, HO | | |
| Trans $C_{17}H_{31}CONH-\text{(phenyl)}-CH_3$ | 72 | |
| Trans $C_{17}H_{31}CONH-\text{(phenyl)}$ | 60 | |
| Conj $C_{17}H_{31}CONH-\text{(phenyl)}$ | 69 | |
| Conj $C_{17}H_{31}CONH-\text{(phenyl)}$ | 39 | 80 |

The effectiveness were tested by use of mice fed on a special diet which was enriched with cholesterol and bile acids. The blood cholesterol level of the mice had been elevated to 3 to 6 times as much value as normal level. The linoleamide compound was well mixed to the specific diet in 1 percent or 0.2 percent amount, and continuously administrated orally for 8 to 12 days. Then the total cholesterol value in the blood serum of the animals was quantitated. The value was calculated to obtain the blood cholesterol level indexes taking the same value of the animals of control group, to which no agent was administered, as 100.

Another significant effectiveness of the N-substituted linoleamide compounds according to the present invention is to prevent the deposition of cholesterol and fat to the liver, which occurs in animals fed on cholesterol diet. It seems that the linoleamide compounds improve the declined lipid-metabolism function of the liver. This effectiveness is also favorable, in view of the fact that the metabolism of lipid mainly relies upon the function of the liver. In linoleic acid, such effectiveness is never observed.

The extremely low toxicities of the present N-substituted linoleamide compounds, which are also the features of the present invention, are illustrated in the following table, in which the acute toxicities of some of the present compounds to mice are listed.

As is seen from the above table, no mortal case and no significant toxic symptoms were observed even in such abundant dose (per os) as 0.5 g. per 10 g., namely 50 g./kg. of the body weight. Also, any of significant toxic symptoms, as well as mortal case, was not observed when N-cyclohexyl- or N-2-methylphenyllinoleamide in 1 percent, 0.5 percent or 0.2 percent amount in diet was administered to mice every day for 3 weeks. The appetite was normal and the digestive function

| Agents | $LD_{50}$ values (g./kg.) | |
|---|---|---|
| | Oral | Intraperitoneal |
| $C_{17}H_{31}CONHCH(CH_3)_2$ | >50 | 1.0 |
| $C_{17}H_{31}CONH-\text{(phenyl)}$ | >50 | 9.0 |
| $C_{17}H_{31}CONH-\text{(phenyl)}-CH_3$ | >50 | 10.5 |
| Linoleic acid | >50 | <1.0 | was unchanged. When the internal organs were inspected by dissection, there was no appreciable change. This was the same in the tests of N-2-methylphenyllinoleamide by use of rats.

The cholesterol-lowering agent of this invention may be orally administered. Usually the amount oral administration is 0.1 g.–20 g. per day, preferably 0.5 g.–5 g. per day and the administration may be continued for 1–5 months, usually for about 3 months. The cholesterol-lowering agent may be in any suitable form which is conventional for oral administration. Thus, it may be encased in a capsule, in a liquid form, in a tablet form, or in a powder form. In preparing the agents in these various forms, the active compound may be mixed with or impregnated in a suitable solid carrier, or it may be mixed with a liquid carrier such as edible oil, preferably those containing linoleic acid. It is also possible to use a mixture of two or more of the N-substituted octadecadienoic acid amides of the invention. It may also be used as mixed with linoleic acid.

What we claim is:

1. An N-substituted octadecadienoic acid of the formula

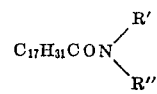

wherein

R' is a member selected from the group consisting of alkenyl of 3–18 carbon atoms, lower alkylcycloalkyl containing 5–7 ring carbon atoms, hydroxycycloalkyl of 5–7 carbon atoms, lower alkoxycycloalkyl containing 5–7 ring carbon atoms, halogenophenyl, halogenoalkylphenyl of 7–10 carbon atoms, trifluoromethylphenyl, trifluoromethylalkylphenyl of 7–10 carbon atoms, trifluoromethylhalogenophenyl, α-alkylbenzyl of 8–11 carbon atoms, alkylbenzyl substituted by alkyl in the benzene ring of 8–12 carbon atoms, hydroxybenzyl and alkoxybenzyl of 8–12 carbon atoms, and R'' is a hydrogen atom or a radical described with respect to R'.

2. An N-substituted octadecadienoic acid according to claim 1, wherein the octadecadienoic acid is selected from the group consisting of linoleic acid, conjugated linoleic acid, translinoleic acid and conjugated translinoleic acid.

3. α-methylbenzyllinoleamide.

* * * * *